United States Patent
Arora et al.

(10) Patent No.: US 7,668,878 B2
(45) Date of Patent: Feb. 23, 2010

(54) REPLICATING DATA BETWEEN HETEROGENEOUS DATA SYSTEMS

(75) Inventors: Nimar Arora, Union City, CA (US); Lik Wong, Union City, CA (US); Neeraj Shadhan, Belmont, CA (US); Anand Lakshminath, Fremont, CA (US); Edwina Lu, Palo Alto, CA (US); Byron Wang, Mountain View, CA (US); Thuvan Hoang, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 269 days.

(21) Appl. No.: 11/496,949

(22) Filed: Jul. 31, 2006

(65) Prior Publication Data

US 2008/0027987 A1    Jan. 31, 2008

(51) Int. Cl.
*G06F 17/30* (2006.01)
*G06F 12/00* (2006.01)

(52) U.S. Cl. .......... 707/204; 707/10; 707/104.1; 707/203; 709/201; 709/224; 709/226

(58) Field of Classification Search .......... None
See application file for complete search history.

(56) References Cited

U.S. PATENT DOCUMENTS

| | | | | |
|---|---|---|---|---|
| 5,721,914 | A | * | 2/1998 | DeVries ............ 707/10 |
| 6,363,421 | B2 | * | 3/2002 | Barker et al. ........ 709/223 |
| 6,658,596 | B1 | * | 12/2003 | Owen et al. ......... 714/16 |
| 6,832,229 | B2 | | 12/2004 | Reed |
| 2002/0112009 | A1 | * | 8/2002 | Capers et al. ........ 709/206 |
| 2003/0133214 | A1 | * | 7/2003 | Miller et al. ........ 360/48 |

* cited by examiner

*Primary Examiner*—Greta L Robinson
*Assistant Examiner*—James J Wilcox
(74) *Attorney, Agent, or Firm*—Hickman Palermo Truong & Becker LLP

(57) ABSTRACT

A method and apparatus for replicating data between heterogeneous databases is provided. Data is replicated between two heterogeneous databases with the use of a volatile storage queue, enabling the rapid replication of data across databases provided by different vendors or operating on different platforms. According to one embodiment, an in-memory queue is used to queue change operations to be performed on a target data repository. The change operations may be operations that were applied to a source data repository. An apply process retrieves the change operations from in-memory queue and commits the change operations to persistent storage. When the change operations have been committed, the apply process notifies the source platform that the particular change operation has been stored.

32 Claims, 5 Drawing Sheets

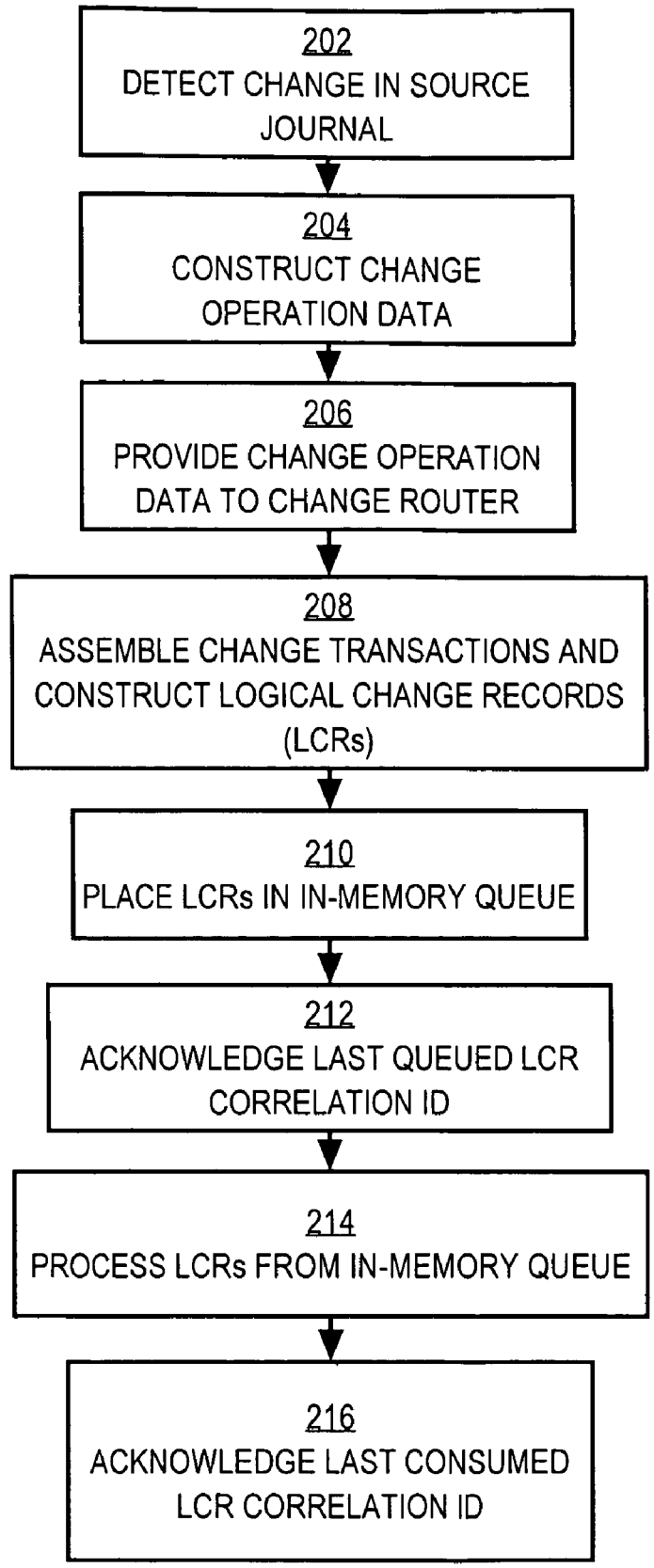

REPLICATING DATA BETWEEN HETEROGENEOUS DATA SYSTEMS

FIELD OF THE INVENTION

The present invention relates to data storage and replication. In particular, embodiments of the present invention relate to replicating data between heterogeneous data systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One use of a database management system (DBMS) is to ensure the security and integrity of mass amounts of data. Data repositories, such as databases and file systems, contain critical data for both individual users and enterprise businesses. Therefore, ensuring the security and integrity of such data is a primary concern for individuals and enterprises alike.

Typically, backup databases and file systems are created in order to ensure that data is not lost in the event of a failure of a database system. However, when data is manipulated on a source database, the change may not be immediately propagated to the backup database. Further, many database platforms are available from different vendors. Users may wish to communicate data between databases provided by different database vendors. This is more commonly known as heterogeneous database replication. For example, vendors may wish to replicate data between an Oracle database and a non-Oracle database.

One drawback of existing database platforms is their inability to communicate with each other. Typically, different database vendors engineer database management systems differently. As such, it is not easy to replicate changes made on a database from one vendor to a database supplied by another vendor.

One replication approach involves taking the changes from the source database and storing them in some persistent storage, such as a hard disk drive or other type of non-volatile storage medium, before applying them to the target database. However, this approach has numerous drawbacks. First, storing changes in persistent storage is a very slow process and limits the maximum data replication rate. For example, persistent storage may only allow changes on the order of one operation per millisecond. If a large amount of data needed to be replicated from one database to another, the process is even slower.

What is desired is a method for heterogeneous data replication that does not suffer from the drawbacks of previous approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram depicting a process for replicating data between two heterogeneous databases, according to one embodiment of the invention;

DETAILED DESCRIPTION

Figure 1:
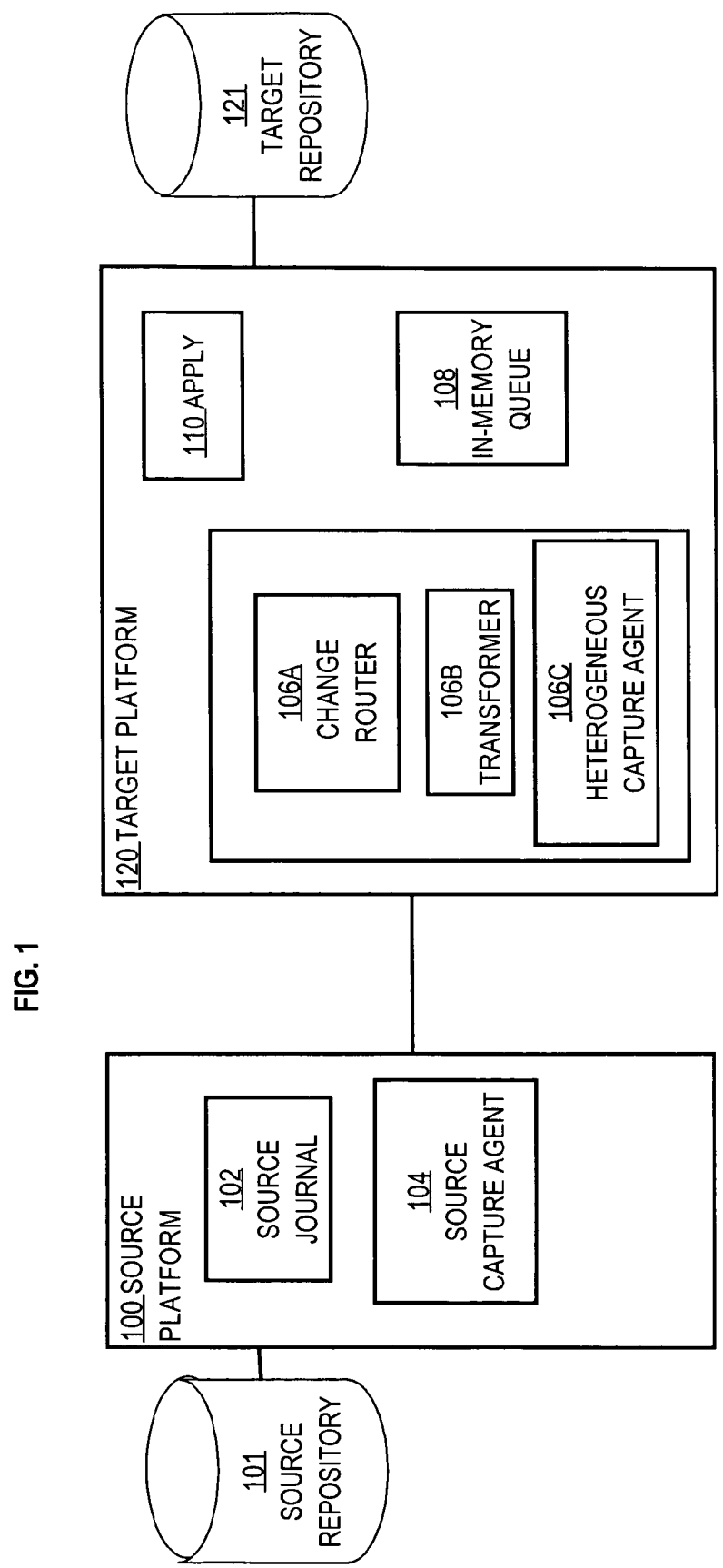
FIG. 1 is a block diagram illustrating a system for replicating data between heterogeneous data systems, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An embodiment of the present invention is a method for replicating data between heterogeneous data systems. According to one embodiment, data is replicated between two heterogeneous databases with the use of a volatile storage queue, enabling the rapid replication of data across databases provided by different vendors or operating on different platforms. A platform provides the underlying operating system and components that allow database and file systems to operate on particular hardware, such as servers or personal computers. For example, such platforms include typical operating systems as provided by Microsoft, Oracle and Linux.

According to one embodiment, an in-memory queue (in volatile memory) is used to queue change operations to be performed on a target data repository. The change operations may be operations that were applied to a source data repository. An apply process retrieves the change operations from the in-memory queue and commits the change operations to persistent storage. When the change operations have been committed, the apply process notifies the source platform that the particular change operation has been stored.

A source data repository is located on a source platform, which includes a source capture agent. The source capture agent monitors a source journal, which maintains a listing of any changes that have been made to the source data repository. The source capture agent queries the source journal to determine if a change has been made to the source data repository. Change data includes change transactions in the source journal and also includes any information necessary to replicate the change on a target repository. Further, the source capture agent assigns a correlation ID for each data operation. Changes from a source repository are communicated to a target platform through intermediate components, which perform data translation and normalization.

In order to apply the changes, the change operation data is enqueued into an in-memory queue on the target platform. The in-memory queue is implemented within a volatile storage medium, and thus allows for data to be replicated at a faster rate than persistent storage.

The target platform performs transactions against the target repository by reading the in-memory queue. For example, an apply process consumes changes from the in-memory queue and applies them to persistent storage. However, because the in-memory queue is volatile, if a crash occurs, all change data in the in-memory queue might be lost. However, in order to avoid the loss of change data, a correlation ID is associated with each change operation that has been enqueued into the in-memory queue. Thus, the target platform will keep track of all correlation IDs corresponding to changes that have been successfully applied to the target repository.

Further, the source platform keeps data pertaining to the change transactions until the source platform receives an acknowledgment that the target platform has applied the change to the target repository or other type of persistent storage. Although the method has been described in relation to the replication of data between heterogeneous data systems, the method is not limited to such an embodiment, and may be applied to other uses such as, for example, auditing, change data capture and asynchronous event notification.

System Overview

Referring now to FIG. 1, a system for replicating data between heterogeneous data systems is shown in accordance with one embodiment. The system includes a source platform 100 and a target platform 120. According to one embodiment, both source platform 100 and target platform 120 are database managements systems provided by different database vendors. Further, source platform 100 and target platform 120 are used to manage source repository 101 and target repository 121, respectively.

Source Platform

Heterogeneous replication system replicates relevant changes in source repository 101 to target repository 121. In order for replication to occur between the heterogeneous platforms, components are located at source platform 100 and Target Platform 120.

Source platform 100 includes a Source journal 102 and a source Capture Agent 104. According to one embodiment, source platform 100 is a Database Management System (DBMS) provided by a particular vendor. Source platform 100 may be an interface for communicating to and editing a source repository 101. In other embodiments, source platform 100 may be a database server for managing source repository 101 through the Internet.

Source Journal

Source platform 100 keeps track of changes made to source repository 101 through use of source journal 102. Source journal 102 tracks incremental changes to source repository 101. Thus, each time a change is made to data within Source repository 101, an entry is made into source journal 102 identifying the change, the location of the change, and any operation that may have completed to institute the change. In other embodiments, other data may be communicated to source journal 102. Further, source journal 102 may query source repository 101 to determine what changes, if any, have been made. Source journal 102 keeps track of changes made to source repository 101 in an incremental manner. For example, changes made to source repository 101 may be made in step by step incremental changes, such that each change is a sequence of operations performed against source repository 101.

According to one embodiment, source journal 102 is a redo log of a typical database system. Redo logs are common in database systems. Redo logs record all changes made to a database as a sequence of operations to be performed against the database. When performed in sequence, the operations cause the identified changes to be committed to the database. Redo logs are used where a database encounters a failure before a change has been completed on a database. Thus, if data is lost, the database system can consult the redo log to determine which operation it should perform next to recover the lost data. However, the invention is not limited to database systems, and source journal 100 may be used to keep track of any changes made to any type of file system, such as a hard disk drive. For example, in one embodiment, source repository 101 may be a file system containing a "log" of changes. In such an embodiment, the file system "log" would be equivalent to source journal 102. Examples of such file systems include, but are not limited to, the Reiser File System (ReiserFS) and the third extension file system (EXT3), both well known in the art.

Thus, source journal 102 keeps track of changes made to source repository 101 in sequence. In order to maintain the sequence of change operations through transfer of data from source platform 100 to Target Platform 120, each operation performed against source repository 101 to institute a change is assigned a change sequence identifier. According to one embodiment, the change sequence identifier is a monotonically increasing value assigned to each change operation within source journal 102.

When source Capture Agent 104 transfers this change operation data to Target Platform 120, the change sequence identifiers for each change operation remain intact. Therefore, even though the format of the data may change, the change sequence identifier for each change operation allows Target Platform 120 to apply change operations in sequence to Target repository 121, to perform error handling, and to reduce data redundancy.

According to one embodiment, the change sequence identifier is referred to herein as the correlation ID. Each change operation includes a correlation ID. Therefore, the sequential order of each operation applied to source repository 101 is kept intact when communicated to Target Platform 120. Further, Target Platform 120 may use the correlation ID of each operation to acknowledge that the operation has been applied to Target repository 121. Further, when source platform 100 communicates the change transaction data to Target Platform 120, the data includes the correlation ID of each transaction in order for Target Platform 120 to correctly apply the transactions in sequence. In order to ensure that Target Platform 120 does not apply the same change more than once, or, in some cases, miss a change entirely, a single change maintains the same correlation both before and after a restart or crash event. Because the same change maintains the same correlation ID, Target Platform 120 can ensure that target platform 120 has not applied the same change twice. Further, according to one embodiment, the correlation ID may be represented as binary data. In order to ensure consistency across the source and target platforms, both the target and source agree on the sorting order of the binary data representing the correlation ID of each change. One such method is to use platform independent binary sort or numeric based comparison. In this manner, organization of change transactions by correlation ID is achieved, ensuring that changes are applied to Target repository 121 in the desired order.

Source Capture Agent

Source Capture Agent 104 monitors source journal 102 for changes. When a new entry is placed into source journal 102, source Capture Agent 104 can determine that a change has been made to the source data repository. However, unlike source journal 102, source Capture Agent 104 does not need to keep track of every change made to source repository 101. Instead, when source Capture Agent 104 detects that source journal 102 has changed, source capture agent 104 can extract relevant data. Thus, source capture agent 104 may act as a filter for determining which change operation data should be accounted for during replication of data between source repository 101 and target repository 121. According to other embodiments, source capture agent 104 periodically queries source journal 102 to determine if any changes have been made to source repository 101.

Further, as described above, to ensure that change operation data is fully accounted for, source Capture Agent 104 associates a correlation ID to each change operation in order to track the progress of changes on target platform 121. For example, when target platform 120 actually applies the transaction that the correlation ID represents, source capture agent 104 can purge the change data which represents the transaction from source journal 102. In this manner, the storage of duplicated or unneeded data is avoided.

At first, the format of the data in source journal 102 may be native to source platform 100. In order to ensure that change data can be communicated to target platform 120, source capture agent 104 is responsible for converting the format of the change operation data into a non-native or open format which target platform 120 understands. According to one embodiment, the open format is an intermediate data format known as the Attunity Change Format. In another embodiment, the intermediate format of the change data is in the Extensible Markup Language (XML). XML is a platform-independent language for communicating structured and non-structured data. The XML data may contain a number of fields, some which may be used for communicating the change transaction data between the source and target data repositories. For example, in order to preserve the order of change transactions across the source and target databases, the XML data may include an operation sequence identifier such as a correlation ID.

Source platform 100 can communicate data to target platform 120 or a Change Router 106A (discussed below) using an open format such as XML. Source platform 100 can communicate the change operation data to target platform 120 in a non-native format.

Change Router

According to one embodiment, source capture agent 104 communicates change operation data to change router 106A, which may be located on target platform 120. Change Router 106A is responsible for receiving change operation data from source capture agent 104 and assembling change transactions. Using the correlation ID associated with each change operation, change router 106A produces transaction-based change data for committed changes in transaction commit order.

Eventually, heterogeneous capture agent 106C will format the change transactions for consumption by target platform 120. According to one embodiment, source capture agent 104 and change router 106A communicate via any appropriate communications interface, such as an Ethernet interface connected to a network such as the Internet. Source capture agent 104 communicates change operation data to source platform 100, which forwards the data to change router 106A for processing. In other embodiments, change router 106A may query source capture agent 104 periodically to retrieve data that change router 106A has not yet processed. Accordingly, source capture agent 104 and change router 106A may operate under a pull or push model for communicating data.

Transformer 106B is responsible for performing normalizations of data for data that may not transfer identically from a source to a target repository. One example would be when a non-relational-to-relational mapping is performed. In other embodiments, change operation data may not need to be normalized, and therefore, the Transformer 106B may be bypassed.

According to one embodiment, change router 106A, transformer 106B and heterogeneous capture agent 106C are all part of target platform 120. However, in other embodiments, change router 106A, transformer 106B and heterogeneous capture agent 106C may be part of an intermediate component operating between source platform 100 and target platform 120, and may be independent from either system.

Change router 106A produces the transaction-based change data. According to one embodiment, only committed changes are recorded, in transaction commit order. Therefore, the integrity of the data is kept at both ends.

Heterogeneous Capture Agent

Heterogeneous capture agent 106C receives change transaction data from change router 106A. The change transaction data may initially be in an intermediate format, and heterogeneous capture agent 106C converts the data into a format native to target platform 120. According to one embodiment, heterogeneous capture agent 106C gets the change transaction data from change router 106A, performs any necessary data format and data type conversions, and constructs Logical Change Records (LCRs) representing the change transactions. According to one embodiment, an LCR is a type of message included as part of the Oracle Call Interface (OCI). The OCI allows developers to program components to call upon Oracle processes through the OCI Application Programming Interface (API). Thus, the OCI allows comprehensive access to Oracle database operations. LCR messages identify change operations to be performed as part of a change transaction on a repository, and include a correlation ID for referencing each change operation.

Once heterogeneous capture agent 106C has formatted the change operation data into LCRs, heterogeneous capture agent 106C pushes the LCRs into an in-memory queue 108 using an enqueue operation, which is an operation available to heterogeneous capture agent 106C through the Oracle OCI API. In another embodiment, heterogeneous capture agent 106C can enqueue non-LCR messages. For example, heterogeneous capture agent 106C may enqueue control messages for indicating important events from source journal 102. These control messages may be passed on to an apply process 110, such that when apply process 110 consumes the message from queue 108, apply process 110 can determine that such an event has occurred. For example, one such event may be a crash, reset or any other type of event that may have occurred on source repository 101.

For each LCR that is enqueued into In-memory queue 108, heterogeneous capture agent 106C keeps track of the unique correlation ID associated with the LCR. Thus, heterogeneous capture agent 106C can store both the correlation ID of the last enqueued LCR and the correlation ID of the last consumed LCR in memory. Alternatively, the correlation ID for the latest consumed LCR may be stored on persistent storage. This way, the system may maintain knowledge of the last LCR to be committed to target repository 121 even after a failure or crash of target platform 120.

In-Memory Queue

As described above, heterogeneous capture agent 106C pushes LCRs into In-memory queue 108. In-memory queue 108 acts as a staging area for changes that have yet to be consumed by apply process 110 or applied to target repository 121. Because In-memory queue 108 is a queue, each change transaction is consumed in a sequential order. Further, LCRs in queue 108 may collectively represent an entire transaction to be applied to target repository 121. Each transaction may have an ordered list of LCRs and may be represented by a correlation ID. Further, each transaction may have an associated transaction ID. According to one embodiment, the last LCR in each transaction is a commit LCR, which, when processed by apply process 110, causes the entire transaction to be committed to target repository 121. In other embodiments, other methods may be used to indicate the end of a transaction. For example, an LCR may include a certain number of bits. In order to indicate the end of transaction, the last bit within an LCR may be set to indicate the end of the transaction. Further, in another embodiment, apply process 110 can detect changes in the correlation IDs for the subsequent LCRs. Because LCRs within the same transaction are bound to a particular correlation ID, the LCRs will not be applied until all changes of the particular transaction have been consumed or processed by apply process 110. Further, in some situations it may be advantageous to artificially advance the restart point for enqueueing LCRs. Thus, heterogeneous capture agent 106C can send empty transactions to In-memory queue 108 so that the correlation ID can be advanced. Because the correlation ID has been advanced, the restart time for enqueueing LCRs will be set at a later correlation ID and source journal 102 may be purged of all transactions associated with preceding correlation IDs. When heterogeneous capture agent 106C enqueues any given LCR, heterogeneous capture agent 106C stores the correlation ID of the last enqueued LCR into memory. Source platform 100 can use this information to determine which changes have been queued for consumption in target platform 120.

Further, the enqueueing of LCR in the in-memory queue may be monitored for flow control. If the enqueueing of the LCRs is taking up too many resources, then heterogeneous capture agent 120 can be forced to wait and/or given an error, which will trigger heterogeneous capture agent 106C to control the flow of LCRs enqueued into Queue 108. Flow control is typically associated with situations where the consumption of messages is slower than the corresponding production of the same messages. Thus, in such cases, if the producer, such as source journal 102, is not slowed down by such a flow control mechanism, then heterogeneous capture agent 106C may receive more messages than heterogeneous capture agent 106C can handle, causing an overflow of system resources, which can deter performance. Therefore, a flow control mechanism may be used to control the flow of messages from source platform 100 to target platform 120. Alternatively, another process which may be used to reduce pressure on system resources involves "spilling" particular LCRs to persistent storage. When spilled to persistent storage, the messages may be acknowledged to heterogeneous capture agent 106C without affecting the performance of in-memory queue 108.

Apply Process

LCRs in in-memory queue 108 are consumed by apply process 110. Apply process 110 is responsible for retrieving LCRs from in-memory queue 108, determining whether to ignore or commit the change operations to target repository 121, and keeping track of the correlation IDs for the last consumed LCRs. When apply process 110 commits a change operation represented by an LCR, the change becomes part of persistent storage, and the change has been replicated from source repository 101 to target repository 121. Because the LCRs are located in in-memory queue 108, as opposed to persistent storage, apply process 110 can consume more change operations in a relatively short time frame. Therefore, the quick replication of data between heterogeneous repositories is enabled. Further, besides or in addition to apply process 110, in-memory queue 108 can have multiple apply subscribers. Thus, changes on source repository 101 may be applied against multiple databases. For example, heterogeneous capture agent 106C may recognize that a particular message is to be applied to a second target repository. Therefore, such a message may be enqueued in a different in-memory queue reserved for the second target repository. In this manner, messages in in-memory queue 108 may be moved to other queues on the same or different platforms. Hence, the system may be used to delegate LCRs among multiple subscribers or platforms.

Essentially, apply process 110 will selectively consume a large number of LCRs, commit transactions to disk, and acknowledge to source platform 100 that apply process 110 has consumed LCRs up to a particular correlation ID. Further, in another embodiment, apply process 110 has the intelligence to compute the dependency for LCRs within in-memory queue 108 and to apply independent transactions in parallel.

However, in-memory queue 108 is volatile by nature. Therefore, if a failure happens at any stage, change transaction data may be lost. In order to provide a safeguard against the duplication of change transactions after a failure, apply process 110 will acknowledge all transactions that apply process 110 has processed by sending an acknowledgement (ACK) that includes the correlation ID of the last consumed LCR. However, although apply process 110 will consume each LCR, apply process 110 does not necessarily need to commit or perform the transaction represented by the LCR. As such, apply process 110 may ignore the LCR and merely acknowledge that apply process 110 has encountered the change operation but decided to ignore the change operation. For example, if the transaction is one that is not needed to institute the change on target repository 121, then apply process 110 may ignore the LCR in this manner.

Referring now to FIG. 2A, a flow chart depicting a process for replicating data between two heterogeneous databases is shown in accordance with one embodiment. At step 202, source capture agent 104 detects a change in source journal 102. As discussed earlier, source capture agent 104 may be notified each time a change occurs within source journal 104, or may alternatively poll source journal 102 periodically to detect any changes. At step 204, source capture agent 104 filters through entries in source journal 102 and converts the data into change operation data. The change operation data is in an intermediate format, and includes a correlation ID for each operation. At step 206, source capture agent 104 then provides the change operation data to change router 106A located on target platform 120. Next, at step 208, change router 106A and heterogeneous capture agent 106C assemble change transactions from the change operation data and create LCRs representing each transaction. Each LCR is a message identifying an operation to be performed against target repository 121, and each LCR has an associated correlation ID.

Once LCRs are created, heterogeneous capture agent 106C pushes the LCRs into queue 108 at step 210. According to one embodiment, heterogeneous capture agent 106C pushes each LCR according to that LCR's correlation ID in an appropriate sequence into Queue 108. When each LCR has been placed into queue 108, heterogeneous capture agent 106C acknowledges the correlation ID of the last LCR to be placed into the queue 108 at step 212. According to one embodiment, heterogeneous capture agent 106C stores information identifying the last enqueued LCR in memory.

Next, at step 214, apply process 110 consumes LCRs from the queue 108. According to one embodiment, apply process 110 consumes LCRs by performing the appropriate transaction and committing the changes to target repository 121. In other embodiments, apply process 110 may ignore particular LCRs. For example, apply process 110 may ignore LCRSs if those LCRs are redundant or irrelevant.

Once apply process 110 has consumed an LCR, at step 216, an acknowledgment of correlation ID for the last consumed LCR is sent from apply process 110 to heterogeneous capture agent 106C, which stores the acknowledgement in persistent storage. Because the information regarding the last consumed correlation ID is stored in persistent storage, if a failure occurs, any component can retrieve the last correlation ID from storage and begin re-enqueing LCRs from that point.

In order to reduce the redundancy of data across both source platform 100 and target platform 120, source platform 100 can periodically query target platform 120 to determine which transactions have been processed and/or applied to target repository 121.

Figure 2B:
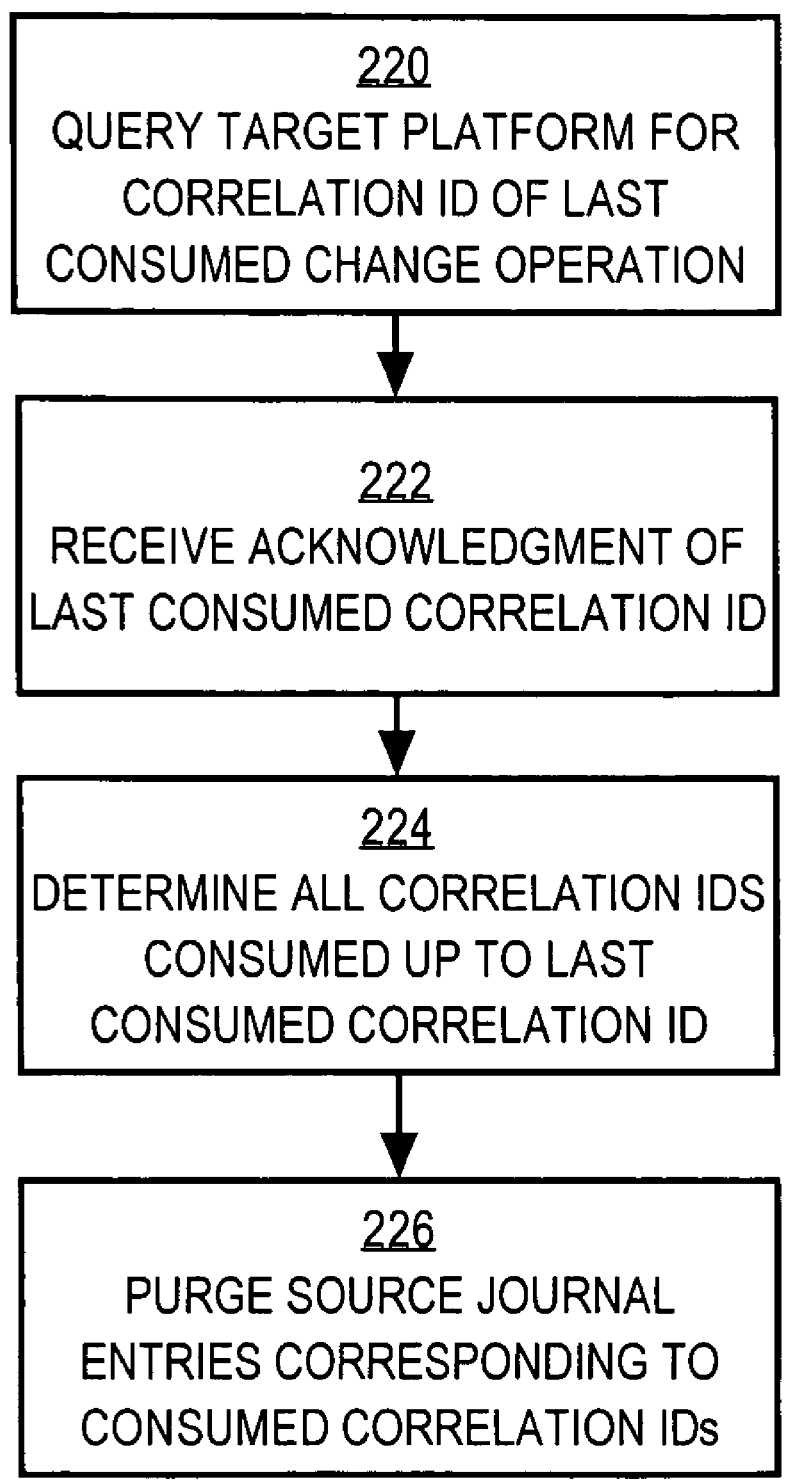
FIG. 2B is a flow diagram depicting a process for purgin change operation data from a source journal, according to one embodiment of the invention.

Referring now to FIG. 2B, a flow chart depicting a process for purging change operation data from a source journal is shown in accordance with one embodiment. At step 220, source platform 100 queries target platform 120 for the correlation ID of the last consumed change operation. In response, at step 222, source platform 100 receives the correlation ID of the last consumed change operation. Although the change operation on target platform is in the form of an LCR, the correlation ID allows source platform to locate the corresponding change operation within source journal 102. Using the last consumed change operation's correlation ID as a guide, at step 224, source capture agent 104 can determine which correlation IDs have been consumed by target platform 120. Specifically, because correlation IDs are assigned in sequence to each change transaction, source platform 100 can assume that all previous change transactions with correlation ID's lower in sequence have been consumed on target platform 120.

At step 226, once it has been determined which correlation IDs have been consumed by target platform 120, source capture agent 104 purges all entries in source journal 102 occurring at or before the last consumed correlation ID.

Crash and Recovery

Although volatile storage enables enqueued transactions to be processed and applied more efficiently than those in persistent storage, transaction data may be lost upon a failure of the target platform 120 or source platform 100. Therefore, according to one embodiment, the system includes the ability to recover transaction data.

Two different correlation IDs may be used to institute a recovery during data replication. One is the last enqueued correlation ID, which represents the last correlation ID to be enqueued into Queue 108. Another correlation ID, which is provided back to source platform 100, is the last correlation ID to be acknowledged by apply process 110. The last acknowledged correlation ID represents the last transaction which was either applied by apply process 110 to persistent storage, or the last correlation ID to be processed by apply process 110. Thus, the last acknowledged correlation ID indicates that all changes associated with a correlation ID preceding the last acknowledged correlation ID have been either applied or spilled to storage. With this information, heterogeneous capture agent 106C can determine that those change LCRs do not need to be resent upon restart.

In order to reduce the possibility of redundancy after a crash or failure of either platform, the correlation ID of the last consumed LCR is stored in persistent storage. Therefore, both platforms can be assured that at least those LCRs up to the last consumed LCR have been either committed to target repository 121 or ignored by apply process 110. In the case of target platform 120 crashing, the correlation ID of the last enqueued LCR will be null because that LCR was stored in volatile memory. Therefore, target platform 120 can rely on the correlation ID of the last consumed LCR to begin re-enqueing LCRs into in-memory queue 108. Once the appropriate LCRs have been re-enqueued, target platform 120 will have recovered and may continue with replication.

However, in the case that source platform 100 crashes during replication. Target platform 120 may receive change operation data with a correlation ID for an LCR that target platform 120 has already enqueued. Because target platform 120 maintains the correlation ID of the last enqueued LCR, target platform 120 can determine that source platform 100 has crashed and can discard any change operation data with correlation IDs occurring before the correlation ID for the last enqueued LCR.

Figure 3:
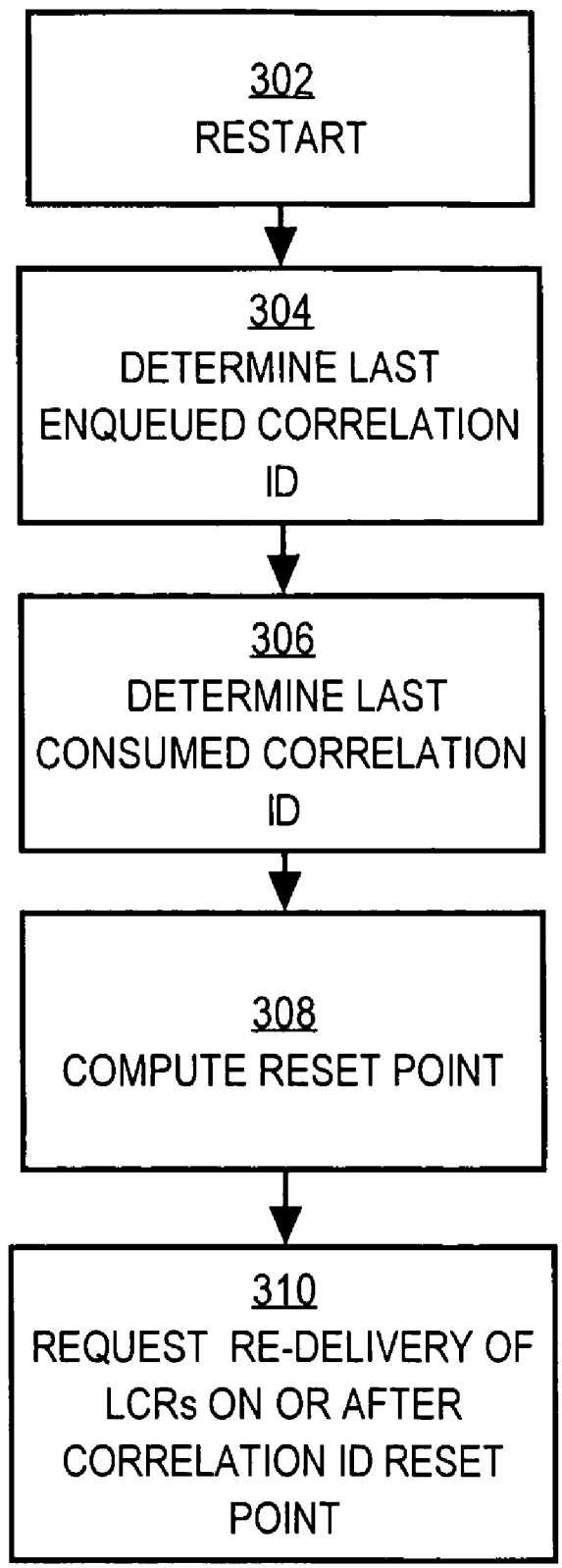
FIG. 3 is a flow diagram depicting a restart and recovery process, according to one embodiment of the invention.

Referring now to FIG. 3, a flow diagram depicting a restart and recovery process is shown in accordance with one embodiment. For example, target platform 120 might crash during the replication of data to target repository 121. Under these circumstances, the LCRs would have been in volatile Queue 108, and the crash would wipe out LCRs that have not been (a) applied or consumed by apply process 110, or (b) spilled into persistent storage. Therefore, at step 302, target platform 120 restarts. When target platform 120 restarts, queue 108 will be empty. In order to re-enqueue LCRs that have been lost due to the crash, target platform 120 determines from which correlation ID to begin re-enqueueing LCRs. Thus, at step 304, target platform determines the last correlation ID to be enqueued by the heterogeneous capture agent 106C. As described above, if target platform 120 crashes, all volatile memory will become null, and therefore the correlation ID of the last enqueued LCR will also be null. Therefore, in order to determine where to begin re-enqueueing LCRs, at step 306, target platform 120 determines the last consumed correlation ID to be processed by apply process 110. At step 308, heterogeneous capture agent 106C computes the reset point for the recovery. The reset point is a correlation ID from which to begin re-enqueing LCRs. From the reset point, any LCRs with a correlation ID after the reset point will be re-enqueued by heterogeneous capture agent 106C into queue 108. In order to retrieve change data that might have been lost on target platform 120 due to a failure, change router 106A can ask source capture agent 104 to resend, back to change router 106A for processing, any change operation data with correlation IDs that occur on or after the reset point. At step 310, heterogeneous capture agent 106C requests the re-delivery of LCRs that have correlation IDs at or after the reset point. Once LCRs have been re-enqueued into in-memory queue 108, the recovery process is complete.

Hardware Overview

Figure 4:
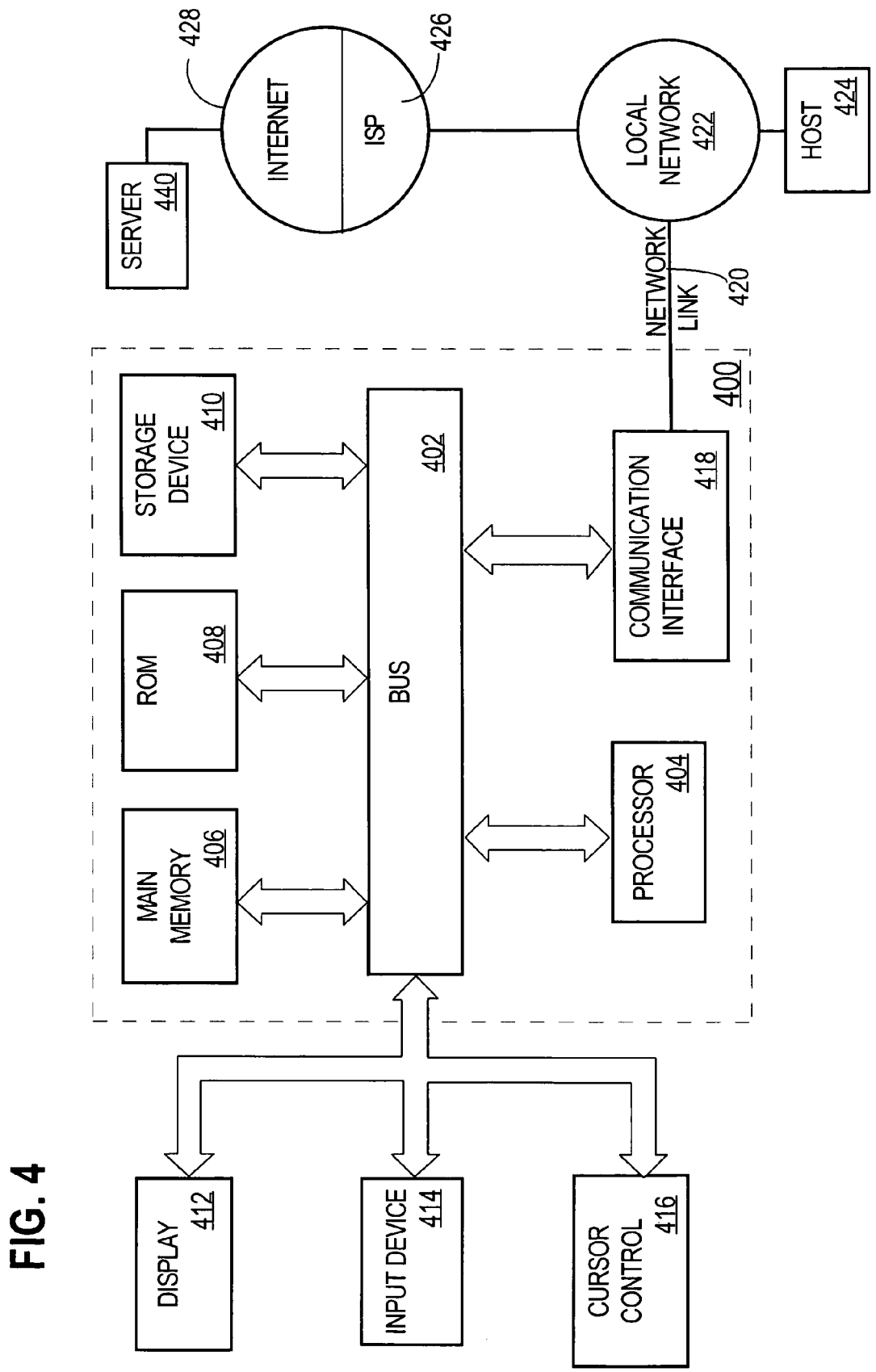
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
retrieving, from a volatile storage queue, first data that identifies an operation that has been performed on a source data repository;
wherein the operation changed data within the source data repository; and
wherein the first data includes
(a) an operation sequence identifier, wherein the operation sequence identifier identifies a sequential order of each operation applied to the source data repository, and
(b) information necessary to replicate the change on a target data repository;
performing the operation on said target data repository;
after the operation on the target data repository has been performed, notifying a process that tracks changes on the source data repository that the operation has been performed on the target data repository, wherein notifying comprises sending to the process that tracks changes on the source repository, a message that includes the operation sequence identifier;
receiving, at the source data repository, the indication that the operation has been performed against the target data repository;
determining, at the source data repository, the operation identifier associated with the first data;
purging the first data from the source data repository; and
wherein the steps of the method are performed by one or more computing devices.

2. The method of claim 1, further comprising receiving the first data in response to a change occurring on a source data repository.

3. The method of claim 1, wherein the process that tracks changes on the source data repository associates the operation sequence identifier with the first data.

4. The method of claim 1, further comprising:
receiving the first data in response to a change occurring on the source data repository;
converting the first data into a non-native format;
wherein converting the first data comprises performing data translation to an intermediate data format understood by a target platform, wherein the target platform performs transactions against the target data repository; and
enqueuing the first data in the volatile storage queue.

5. The method of claim 4, further comprising:
in response to enqueuing the first data in the volatile storage queue, storing the operation sequence identifier of the first data in memory.

6. The method of claim 5, further comprising:
receiving second data, wherein the second data includes a second operation sequence identifier;
examining the operation sequence identifier of the first data in memory;
determining that the operation sequence identifier of the first data occurs after the operation sequence identifier for the second data; and
discarding the second data.

7. The method of claim 1, wherein the volatile storage queue is an in-memory queue.

8. The method of claim 1, wherein said source data repository is a source file system and wherein said target data repository is a target file system.

9. The method of claim 8, wherein said first data represents one or more changes performed on the source file system.

10. The method of claim 1, further comprising the additional step of:
in response to performing the operation against the target data repository, removing the first data from the volatile storage queue.

11. The method of claim 1, further comprising:
in response to performing the operation against the target data repository, storing the operation sequence identifier of the first data in persistent storage.

12. The method of claim 11, further comprising:
retrieving the operation sequence identifier of the first data from persistent storage;
determining that the operation represented by the first data has been performed against the target data repository; and
discarding any operations represented by data with an operation sequence identifier occurring before the operation sequence identifier of the first data.

13. The method of claim 1, wherein the volatile storage queue comprises a plurality of data representing operations to be performed against the target data repository.

14. The method of claim 6, wherein each data in the volatile storage queue contains an operation sequence identifier.

15. A computer-readable storage medium storing one or more sequences of instructions which, when executed by one or more processors, causes the one or more processors to perform:
retrieving, from a volatile storage queue, first data that identifies an operation that has been performed on a source data repository;
wherein the operation changed data within the source data repository; and
wherein the first data includes
(a) an operation sequence identifier, wherein the operation sequence identifier identifies a sequential order of each operation applied to the source data repository, and
(b) information necessary to replicate the change on a target data repository;
performing the operation on said target data repository;
after the operation on the target data repository has been performed, notifying a process that tracks changes on the source data repository that the operation has been performed on the target data repository, wherein notifying comprises sending to the process that tracks changes on the source repository, a message that includes the operation sequence identifier;
receiving, at the source data repository, the message that indicates that the operation has been performed against the target data repository;

determining, at the source data repository, the operation identifier associated with the first data; and purging the first data from the source data repository.

16. The computer-readable storage medium of claim 15, further comprising instructions for receiving the first data in response to a change occurring on a source data repository.

17. The computer-readable storage medium of claim 15, wherein the process that tracks changes on the source data repository associates the operation sequence identifier with the first data.

18. The computer-readable storage medium of claim 15, further comprising instructions for performing:

receiving the first data in response to a change occurring on the source data repository;

converting the first data into a non-native format;

wherein converting the first data comprises performing data translation to an intermediate data format understood by a target platform, wherein the target platform performs transactions against the target data repository; and enqueuing the first data in the volatile storage queue.

19. The computer-readable storage medium of claim 18, further comprising instructions for:

in response to enqueuing the first data in the volatile storage queue, storing the operation sequence identifier of the first data in memory.

20. The computer-readable storage medium of claim 19, further comprising instructions for:

receiving second data, wherein the second data includes a second operation sequence identifier;

examining the operation sequence identifier of the first data in memory;

determining that the operation sequence identifier of the first data occurs after the operation sequence identifier for the second data; and discarding the second data.

21. The computer-readable storage medium of claim 15, wherein the volatile storage queue is an in-memory queue.

22. The computer-readable storage medium of claim 15, wherein said source data repository is a source file system and wherein said target data repository is a target file system.

23. The computer-readable storage medium of claim 22, wherein said first data represents one or more changes performed on the source file system.

24. The computer-readable storage medium of claim 15, further comprising instructions for:

in response to performing the operation against the target data repository, removing the first data from the volatile storage queue.

25. The computer-readable storage medium of claim 15, further comprising instructions for:

in response to performing the operation against the target data repository, storing the operation sequence identifier of the first data in persistent storage.

26. The computer-readable storage medium of claim 25, further comprising instructions for:

retrieving the operation sequence identifier of the first data from persistent storage;

determining that the operation represented by the first data has been performed against the target data repository; and discarding any operations represented by data with an operation sequence identifier occurring before the operation sequence identifier of the first data.

27. The computer-readable storage medium of claim 15, wherein the volatile storage queue comprises a plurality of data representing operations to be performed against the target data repository.

28. The computer-readable storage medium of claim 20, wherein each data in the volatile storage queue contains an operation sequence identifier.

29. The method of claim 1, wherein the step of notifying is performed in response to performing the operation on the target repository.

30. The method of claim 1, wherein the step of notifying is performed in response to a query received by the target platform from the source platform.

31. The computer readable storage medium of claim 15, wherein the step of notifying is performed in response to performing the operation on the target repository.

32. The computer readable storage medium of claim 15, wherein the step of notifying is performed in response to performing the operation on the target repository.

* * * * *